United States Patent
Werner et al.

(10) Patent No.: US 9,862,487 B2
(45) Date of Patent: Jan. 9, 2018

(54) REMOTE-CONTROLLED PLATFORM SHAPED AIRCRAFT

(71) Applicant: Aibotix GmbH, Kassel (DE)

(72) Inventors: Carsten Werner, Kassel (DE); Uwe Chalas, Breuna (DE)

(73) Assignee: AIBOTIX GMBH, Kassel (DE)

( * ) Notice: Subject to any disclaimer, the term of this patent is extended or adjusted under 35 U.S.C. 154(b) by 297 days.

(21) Appl. No.: 14/286,888

(22) Filed: May 23, 2014

(65) Prior Publication Data

US 2016/0144953 A1    May 26, 2016

(51) Int. Cl.
  *B64C 27/20*  (2006.01)
  *B64C 27/00*  (2006.01)
  *B64C 39/02*  (2006.01)
  *A63H 27/00*  (2006.01)

(52) U.S. Cl.
  CPC ........... *B64C 39/024* (2013.01); *A63H 27/12* (2013.01); *B64C 27/001* (2013.01); *B64C 27/20* (2013.01); *B64C 2201/027* (2013.01); *B64C 2201/042* (2013.01); *B64C 2201/127* (2013.01); *B64C 2201/146* (2013.01)

(58) Field of Classification Search
  CPC ....... B64C 27/001; B64C 27/08; B64C 27/20; B64C 2027/002; B64C 2201/027; B64C 2201/042
  See application file for complete search history.

(56) References Cited

U.S. PATENT DOCUMENTS

| | | | |
|---|---|---|---|
| 3,082,977 A | | 3/1963 | Arlin |
| 5,555,175 A | * | 9/1996 | D'orso ................. G08G 5/0086 701/301 |
| 6,158,690 A | * | 12/2000 | Wadey ...................... B64C 1/40 244/117 R |
| 7,616,449 B2 | * | 11/2009 | Batcheller ............ H05K 1/0271 361/748 |
| 8,322,648 B2 | * | 12/2012 | Kroetsch ............... B64C 39/024 244/17.23 |
| 8,973,861 B2 | * | 3/2015 | Zhou ...................... B64C 27/20 244/17.23 |

(Continued)

FOREIGN PATENT DOCUMENTS

| | | |
|---|---|---|
| DE | 1 756 879 U | 11/1957 |
| DE | 24 45 495 A1 | 3/1975 |

(Continued)

OTHER PUBLICATIONS

DE Office Action dated Jun. 26, 2012 as received in Application No. 10 2011 119 590.8.

(Continued)

*Primary Examiner* — Richard R Green
(74) *Attorney, Agent, or Firm* — Maschoff Brennan

(57) ABSTRACT

The subject matter of the invention is a remote-controllable, disk-shaped aircraft platform, comprising a platform housing and at least one transport housing, the platform housing having a plurality of motor-driven, horizontally aligned rotors, each rotor being connected via a support arm to a support structure holding the support arms of the rotors, the support structure being centrally arranged in the platform housing, the support structure accommodating at least one transport housing in a vibrationally isolated manner.

16 Claims, 3 Drawing Sheets

(56) References Cited

U.S. PATENT DOCUMENTS

| | | | |
|---|---|---|---|
| 9,004,973 B2* | 4/2015 | Condon | A63F 13/00 |
| | | | 446/37 |
| 9,221,539 B2* | 12/2015 | Christensen | B64C 27/32 |
| 2005/0236517 A1 | 10/2005 | Akaro et al. | |
| 2009/0283629 A1 | 11/2009 | Kroetsch et al. | |
| 2014/0374532 A1* | 12/2014 | Duffy | B64C 39/024 |
| | | | 244/2 |

FOREIGN PATENT DOCUMENTS

| | | |
|---|---|---|
| DE | 10 2008 014 853 B4 | 10/2009 |
| DE | 10 2009 001 759 A1 | 10/2010 |
| DE | 10 2009 033 821 A1 | 10/2011 |
| JP | 2011-046355 A | 3/2011 |
| WO | WO 2006112578 A1 * 10/2006 | ............ B64C 27/20 |
| WO | 2011/058255 A1 | 5/2011 |

OTHER PUBLICATIONS

European Search Report dated Feb. 13, 2013 as received in Application No. 12007495.0.
"Flying Eye of Kassel: Intelligent Flying Object with Camera of Aibotix", Published on May 5, 2011, pp. 2. (English Translation).
"Aibot X6: Flying Intelligence opens up new dimensions for business applications from the air", United News Network GmbH, Jul. 18, 2011, pp. 3.
"Change your Point of View", Aibot-X6, Screen Shot http://web.archive.org from web site www.aibotix.com, Jul. 19, 2011, pp. 1.

* cited by examiner

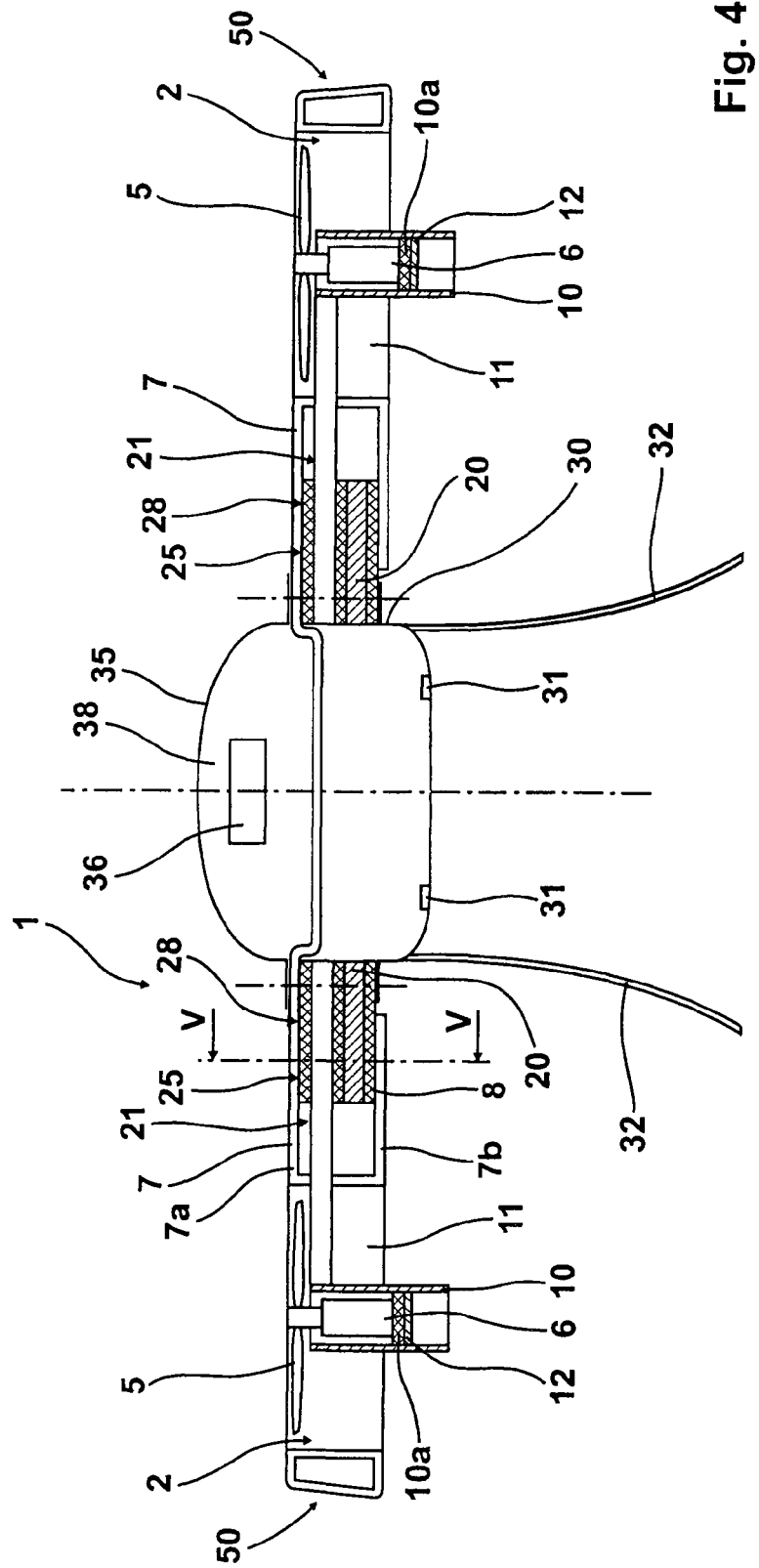
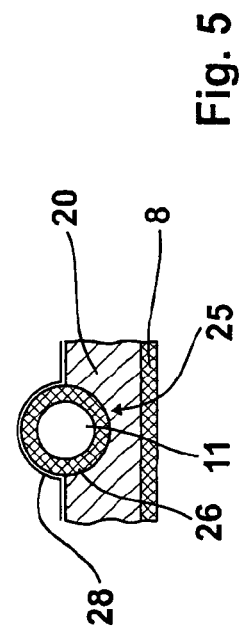
Fig. 4
Fig. 5

REMOTE-CONTROLLED PLATFORM SHAPED AIRCRAFT

BACKGROUND

The invention relates to a remote-controllable, disk-shaped aircraft platform, comprising a platform housing, in which the platform housing has a plurality of motor-driven, horizontally aligned rotors.

Remote-controlled aircraft or aircraft platforms are known, for example, as toys, in which the aircraft have a plurality of horizontally arranged rotors in disk form, which serve, on one hand, for ascension, and on the other hand, to propel the aircraft.

At the same time, however, aircraft are also known that are designed as aircraft platforms to serve industrial or even military purposes. These types of aircraft platforms, particularly for industrial purposes, have a diameter of between one-half meter and one meter and more. Such types of remote-controllable aircraft platforms, also called flying robots, when equipped with a camera on the bottom, are used to obtain information on the behavior of crowds of people, to check on construction sites, e.g. houses or even bridges, or also to check on industrial installations, particularly chemical plants in this case. These types of aircraft in the form of aircraft platforms have, among other things, accelerators and gyroscopes, in order to pilot such types of aircraft platforms. The rotors generate oscillations, which are naturally transmitted to the housing of the aircraft platform. Such types of oscillations may lead to malfunctions in the accelerators and gyroscopes, which results in imprecise location detection in the aircraft platform, which, in turn, negatively impacts the flight properties.

Reference has already been made to the fact that such aircraft platforms are already being used to generate aerial images or videos. Vibrations at the camera are also disadvantageous particularly with reference to video recordings, because shaky recordings may be unusable.

SUMMARY

Some embodiments provide for a remote-controllable aircraft platform of the aforementioned type with which the vibrations generated by the rotors during operation of the platform would not have any negative influence on the flight properties of the platform and in which the payload, for example a camera, would experience essentially no negative impact from vibrations.

Some embodiments include a remote-controllable aircraft platform of the aforementioned type in accordance with the invention, that each rotor be connected via a support arm to a support structure holding the support arms of the rotors, the support structure being arranged centrally in a platform housing, in which at least one transport housing is held by the support structure in a manner vibrationally isolated from the motor-driven rotors. In this case, the transport housing accommodates devices, for example, devices for flight position detection, i.e. accelerators and gyroscopes. On the other hand, this transport housing is also used to accommodate the payload, i.e. particularly a camera, thereby enabling such a camera to record low-vibration or vibration-free images during the flight operation by virtue of the vibration isolation.

Thus, according to a special feature of the invention, it is provided that the support structure have an oscillation-damping material. This makes it clear that the oscillations that are transmitted by the motor-driven rotor via the support arm to the support structure are absorbed by the support structure, consequently making the transport housing oscillation-free or practically oscillation-free. To this end, the support structure is made of a hard foam that is an oscillation-absorbing material. The use of such a hard foam to produce the support structure has the advantage, on one hand, that the support structure is extremely stiff but, on the other hand, due to the properties of the foam, is still able to absorb or to a large extent absorb the oscillations introduced by the support arms. It has proven to be particularly advantageous when the connection between the support structure, on one hand, and the respective support arm, on the other hand, is implemented using a oscillation-damping material. The oscillation-damping material can be, for example, an elastomer, such as silicone, thereby meaning that the portion of oscillations that is actually transmitted to the support structure is reduced. The same goal is served by accommodating the motor of the respective rotor through the support arm essentially in vibrational isolation. The support arm has a support arm head on the end, in which the head is essentially shaped cylindrically. In order to minimize the transmission of oscillations of the rotor to the support arm via the motor, the motor of the rotor is accommodated in the support arm head, for example, by an oscillation-damping elastomer layer.

According to another feature of the invention, the support structure is connected to the platform housing in an essentially vibrationally isolated manner. The platform housing itself has sensors on the front, e.g., for distance detection. The operation of such sensors can also be negatively influenced by oscillations. Reference has already been made to the fact that the support structure itself is capable of absorbing a significant portion of the oscillations by using, for example, a foam material. An additional absorption of oscillations is achieved in that the platform housing is connected to the support structure in a vibrationally isolating manner through, e.g., elastomer bodies.

According to another feature of the invention, the support structure itself is formed like a wreath, the support arms for holding the rotors being arranged in equidistant distribution around the periphery of the support structure formed like a wreath. This means that the support arms are connected to one another not directly but rather indirectly via the support structure. In this case, due to the isolation of the vibrations of the support arms, the development of resonances is prevented.

According to another feature of the invention, the transport housing is formed in the shape of a bowl or pot to be held by the support structure. This bowl- or pot-like transport housing, which may also be designed in a skeletonized manner in order to reduce weight, contains, as previously mentioned, the electric and electronic devices on one hand, e.g., for flight positioning recognition such as, for example, accelerators and gyroscopes, while, on the other hand, this bowl- or pot-like transport housing also contains the payload, for example a camera. The advantage of using a transport housing in the form of a pot or bowl is also that this also increases the stiffness of the support structure itself. The result of this is that the platform housing essentially does not have to have any inherent stability, which means that the platform housing may be configured in a very lightweight design.

The bowl- or pot-like transport housing is advantageously located on the bottom of the aircraft platform, which has inherent advantages with reference to the center of gravity of the aircraft platform. A flat cover is located on the top of the support structure, which, together with a base, forms a housing chamber. The base in this case may be a component of the platform housing, particularly the upper shell of the double-shell platform housing. This housing chamber serves, for example, to house the battery. The cover also serves, to a certain extent, as stiffening for the support structure, similar to the transport housing, which is located opposite the bottom of the support structure. Located on the support structure or else on the transport housing are at least three legs, on which the aircraft platform stands on the ground.

The platform housing itself is designed in the shape of a disk and equipped with recesses for the rotors according to the number of rotors. The platform housing furthermore exhibits a closed contour on the front. The advantage with a platform housing that is closed on the front is that this protects the rotors. This means that when such a platform makes contact with objects during the flight, then this does not automatically mean that the rotors will be damaged. Furthermore, the risk of injury to people by the high-speed rotors when making contact with such a flying platform is reduced. The front of the closed contour of the platform has sensors distributed along the periphery to determine the distance between the aircraft platform and other objects.

The recesses for the rotors are arranged in the edge area of the platform housing. The closed contour on the front of the platform housing follows, in the shape of a wave, the arrangement of the recesses for the rotors in the platform housing. In connection with the recesses for the individual rotors, this therefore results in a skeletonized and thus lightweight platform housing.

As explained, the platform housing is composed of an upper and a lower shell, both of which together form a stable design. This is because the upper and lower shell form one housing.

BRIEF DESCRIPTION OF THE DRAWINGS

In reference to the drawings, the invention is explained in greater detail by way of example.

FIG. 4 shows a section along line IV-IV from FIG. 1;

FIG. 5 shows a section along line V-V from FIG. 4.

DETAILED DESCRIPTION

Figure 1:
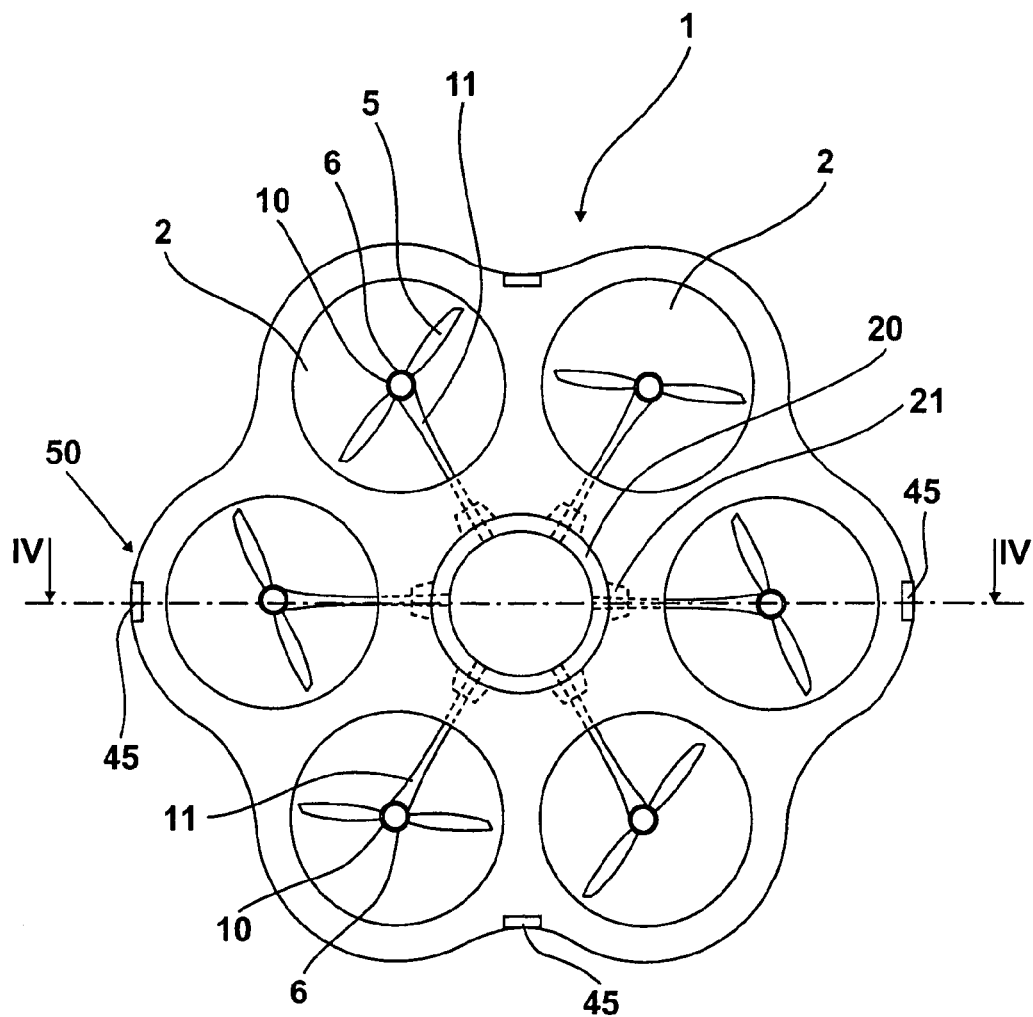
FIG. 1 shows the remote-controllable aircraft platform in a view from above.
Figure 2:
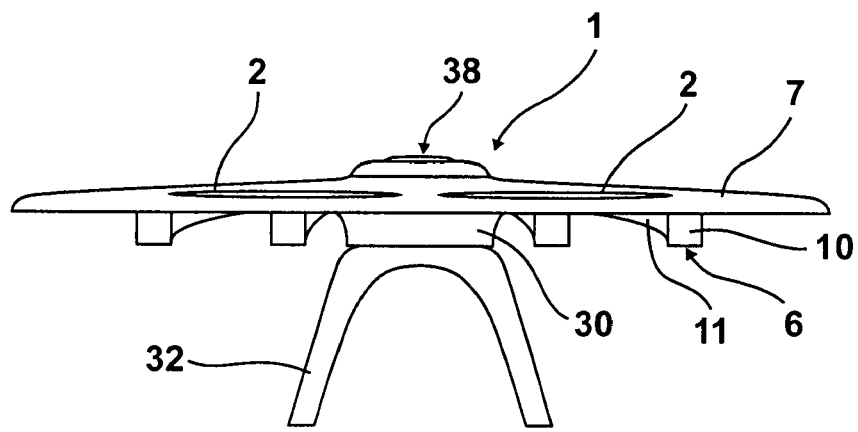
FIG. 2 shows a side view according to FIG. 1.

The aircraft platform, which is designated overall as 1, has a total of six circular recesses 2 for the rotors, which are designated as 5. Each rotor comprises one motor 6, which is accommodated in an oscillation-damping manner through the support arm head 10 of the support arm 11, e.g. through elastomer bodies. In this case, the support arm head 10 has a base 12, upon which an elastomer cushion 10a is arranged in order to accommodate the motor 6. Each support arm 11 is held by the support structure, which is designated overall as 20. The support structure 20 is shown as a wreath- or ring-shaped structure, in which the support arm structure 20 has shell-like recesses 13 and flange-like projections 21 in the area of the transition to the support arms 11 in order to enlarge the contact surface for the support arms. The support arms 11 are held by the support structure 20 in the area of the attachments 21.

Figure 3:
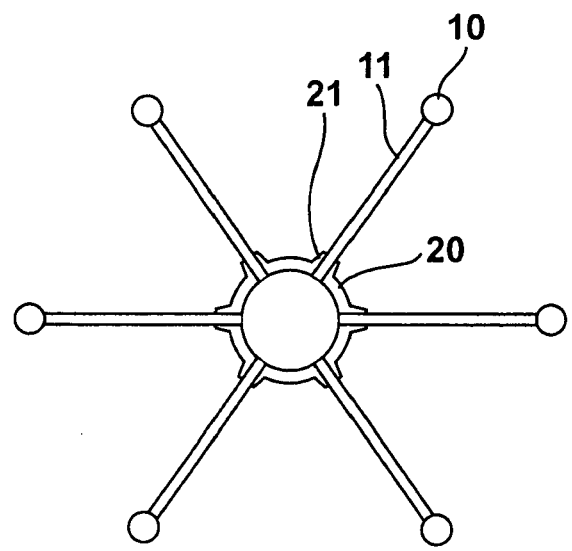
FIG. 3 shows the support structure including the attached support arms in the shape of a star in a view from above when the support structure is installed.

Details of the arrangement of the support arms 11 on the support structure 20 can be seen in FIGS. 3 through 5. Thus, FIG. 3 shows that the support structure 20 has a shell-like recess 25 in the area of the flange-like attachments 21 to accommodate the support arms 11. There is elastomer material 26 between the top of the shell-like recess and the support arm 11, e.g. in the form of a cushion, which may, on one hand, be bonded with the shell-like recess and the support structure 20 and, on the other hand, be bonded with the support arm. However, it is also conceivable to use, for example, a silicone adhesive in order to directly bond the support arm 11 in the shell-like recess 25 of the support structure 20. Use of such type of elastomer cushion or even bonding, for example using a silicone adhesive, ensures a reduction in the transmission of oscillations or vibrations from the support arm to the support structure. For secure attachment of the support arm 11 in the shell-like recess 25 of the support structure, a tab 28 may be provided on the top, which rests against the top of the support arm above the elastomer cushion 26 and is arranged on the support structure. The support structure 20 may also be placed on the platform housing above the elastomer cushion 8.

The bowl- or pot-like transport housing 30 is located on the support structure 20. Gyroscopes or accelerators (not shown), which are required for piloting the aircraft platform during flight operations are mounted, for example, in the transport housing 30. Furthermore, the transport housing has means for attaching a camera (not shown) in the form of the threaded bushings 31. Located on the top of the aircraft platform is a cover 35, through which, in conjunction with a base that may be provided by a recess in the platform housing, a housing chamber 38 is formed that serves, for example, to accommodate a battery 36. The individual electric motors 6 for the rotors 5 are provided with power by the battery 36. However, it is also conceivable for the battery to be placed directly on the cover 35.

The aircraft platform 1 furthermore comprises, as previously explained, the platform housing 7. The platform housing comprises an upper and a lower shell 7a, 7b, which are connected to one another, in particular bonded. This provides the platform housing with inherent stability that in the end is further enhanced by the support structure. The platform housing 7 is connected to the support structure, for example bonded. The disk-shaped platform housing 7 is discernible on the front (arrow 50), which is closed on all sides. The recesses 2 for the rotors 5 and the front, bow-shaped pattern of the platform housing around the recesses 2 results in a skeletonized form of this platform housing. This means that, for reasons of weight reduction, only as much material remains between individual recesses on the platform housing as is necessary for the stability of the platform housing in conjunction with the support structure 20 and for forming the closed contour on the front. Such a closed contour has multiple advantages; on one hand, it can be noted that the rotors are protected in the event of unintentional contact with objects during flight operation, while, on the other hand, people are protected from the rotors should they accidentally come into contact with the aircraft while it is being operated. This is of particular importance given the fact that the rotors have a very high rotational speed.

In this context, it should be noted that stability is provided not only by the support structure 20, but rather also by the bowl- or pot-like transport housing 30 arranged on the support structure. For this bowl- or pot-like transport housing 30 ensures an increase in the torsional stiffness of the wreath- or ring-shaped support structure 20. The cover 35, which is located on the top of the support structure 20, functions in the same manner as well.

There are three legs 32 on the transport housing 30 that the aircraft platform 30 uses to stand on the ground.

Sensors 45 are located on the front of the platform housing, which serve to determine the lateral distance between the aircraft platform and objects during flight operations.

REFERENCE LIST

1 Aircraft platform
2 Circular recesses
5 Rotors
6 Electric motor
7 Platform housing
7a Upper shell of the platform housing
7b Lower shell of the platform housing
8 Elastomer cushion between support structure and platform housing
10 Support arm head
10a Elastomer cushion in support arm head
11 Support arm
12 Base in support arm head
20 Support structure
21 Flange-like attachments
25 Shell-like recess
26 Elastomer material
28 Tab
30 Transport housing
31 Threaded bushing
32 Leg
35 Cover
36 Battery
38 Housing chamber
45 Sensors
50 Arrow

The invention claimed is:

1. A remote-controllable, disk-shaped aircraft platform, comprising:
   a platform housing, the platform housing having a plurality of motor-driven, horizontally aligned rotors, each rotor being connected via a support arm to a support structure holding the support arms of the rotors,
   the support structure being centrally arranged in the platform housing, wherein the support structure includes multiple channels, each with an end of a corresponding one of the support arms disposed therein, further comprising a first oscillation-damping cushion in each channel between the support structure and the end of the corresponding support arm, the first oscillation-damping cushions in the channels preventing direct contact between the support arms and the support structure, each of the first oscillation-damping cushions surrounding at least one-quarter of a length of the corresponding support arm,
   at least one transport housing being accommodated by the support structure in a manner vibrationally isolated from the motor-driven, horizontally aligned rotors, and
   a second oscillation-damping cushion between the support structure and the platform housing and in direct contact with each and preventing the support structure and the platform housing from coming in direct contact with each other,
   wherein the support structure comprises a ring-shaped support structure that surrounds and is in contact with an exterior cylindrical surface of the transport housing, the support arms for holding the rotors being arranged in equidistant distribution around a periphery of the ring-shaped support structure.

2. The remote-controllable, disk-shaped aircraft platform according to claim 1, wherein the support structure has an oscillation-damping material.

3. The remote-controllable, disk-shaped aircraft platform according to claim 2, wherein the support structure is essentially formed from a hard foam material.

4. The remote-controllable, disk-shaped aircraft platform according to claim 1, further comprising an oscillation-damping layer between each rotor and each corresponding support arm, each rotor being supported by the corresponding support arm through a corresponding oscillation-damping layer.

5. The remote-controllable, disk-shaped aircraft platform according to claim 1, wherein the transport housing for accommodating by the support structure is shaped like a bowl or pot.

6. The remote-controllable, disk-shaped aircraft platform according to claim 5, wherein the bowl- or pot-shaped transport housing accommodates electric or electronic devices for operating the aircraft platform.

7. The remote-controllable, disk-shaped aircraft platform according to claim 5, wherein the bowl- or pot-shaped transport housing has means for attaching a payload.

8. The remote-controllable, disk-shaped aircraft platform according to claim 7, wherein the means for attaching a payload comprises threaded bushings.

9. The remote-controllable, disk-shaped aircraft platform according to claim 5, wherein the bowl- or pot-shaped transport housing is arranged on the bottom of the aircraft platform.

10. The remote-controllable, disk-shaped aircraft platform according to claim 1, wherein the support structure has a housing chamber on the top.

11. The remote-controllable, disk-shaped aircraft platform according to claim 1, wherein the platform housing is configured in the shape of a disk and has recesses for the rotors corresponding to the number of rotors.

12. The remote-controllable, disk-shaped aircraft platform according to claim 1, wherein the platform housing forms a closed contour on the front.

13. The remote-controllable, disk-shaped aircraft platform according to claim 1, wherein the closed contour on the front has distance sensors on the front.

14. The remote-controllable, disk-shaped aircraft platform according to claim 1, wherein the support structure includes multiple flange-shaped projections that extend outward from the ring-shaped support structure and arranged in the equidistant distribution around the periphery of the ring-shaped support structure, each of the flange-like projections providing an enlarged contact surface to support through a corresponding one of the first oscillation-damping cushions the end of the corresponding one of the support arms.

15. A remote-controllable, disk-shaped aircraft platform, comprising:
   a platform housing, the platform housing having a plurality of motor-driven, horizontally aligned rotors, each rotor being connected via a support arm to a support structure holding the support arms of the rotors,
   the support structure being centrally arranged in the platform housing,
   at least one transport housing being accommodated by the support structure in a manner vibrationally isolated from the motor-driven, horizontally aligned rotors, and a first oscillation-damping cushion between the support structure and the platform housing and in direct contact with each and preventing the support structure and the platform housing from coming in direct contact with each other, wherein:
the support structure is essentially formed from a hard foam material,
the support structure includes multiple channels, each with an end of a corresponding one of the support arms disposed therein, further comprising a second oscillation-damping cushion in each channel between the support structure and the end of the corresponding support arm, the second oscillation-damping cushions in the channels preventing direct contact between the support arms and the support structure,
the support structure comprises a ring-shaped support structure that surrounds and is in contact with an exterior cylindrical surface of the transport housing, the support arms for holding the rotors being arranged in equidistant distribution around a periphery of the ring shaped structure, and
further comprising an oscillation-damping layer between each rotor and each corresponding support arm, each rotor being supported by the corresponding support arm through a corresponding oscillation-damping layer.

16. A remote-controllable, disk-shaped aircraft platform, comprising:
a platform housing, the platform housing having a plurality of motor-driven, horizontally aligned rotors, each rotor being connected via a support arm to a support structure holding the support arms of the rotors,
the support structure being centrally arranged in the platform housing,
at least one transport housing being accommodated by the support structure in a manner vibrationally isolated from the motor-driven, horizontally aligned rotors, and
a first oscillation-damping cushion between the support structure and the platform housing and in direct contact with each and preventing the support structure and the platform housing from coming in direct contact with each other, wherein:
the support structure is essentially formed from a hard foam material,
the support structure includes multiple channels, each with an end of a corresponding one of the support arms disposed therein, further comprising a second oscillation-damping cushion in each channel between the support structure and the end of the corresponding support arm, the second oscillation-damping cushions in the channels preventing direct contact between the support arms and the support structure, each of the second oscillation-damping cushions surrounding at least one quarter of a length of the corresponding support arm,
the support structure comprises a ring-shaped support structure that surrounds and is in contact with an exterior cylindrical surface of the transport housing, the support arms for holding the rotors being arranged in equidistant distribution around a periphery of the ring shaped structure, and
further comprising an oscillation-damping layer between each rotor and each corresponding support arm, each rotor being supported by the corresponding support arm through a corresponding oscillation-damping layer.

\* \* \* \* \*